(12) United States Patent
Kishi et al.

(10) Patent No.: US 8,081,235 B2
(45) Date of Patent: Dec. 20, 2011

(54) IMAGE PICKUP APPARATUS AND FLICKER DETECTION METHOD THEREFOR

(75) Inventors: Takafumi Kishi, Kawasaki (JP); Koji Oshima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 695 days.

(21) Appl. No.: 12/248,627

(22) Filed: Oct. 9, 2008

(65) Prior Publication Data
US 2009/0122155 A1    May 14, 2009

(30) Foreign Application Priority Data
Nov. 12, 2007   (JP) .................................. 2007-293243
Nov. 12, 2007   (JP) .................................. 2007-293245

(51) Int. Cl.
*H04N 9/73*    (2006.01)
(52) U.S. Cl. ..................... 348/226.1; 348/302; 348/324; 348/230.1
(58) Field of Classification Search ................ 348/226.1, 348/302, 324, 230.1
See application file for complete search history.

(56) References Cited

U.S. PATENT DOCUMENTS

| | | | |
|---|---|---|---|
| 5,546,127 A * | 8/1996 | Yamashita et al. ............ | 348/297 |
| 6,710,818 B1 * | 3/2004 | Kasahara et al. ............. | 348/607 |
| 2003/0030744 A1 * | 2/2003 | Baer ............................. | 348/370 |
| 2004/0090535 A1 * | 5/2004 | Watanabe .................. | 348/222.1 |
| 2004/0165084 A1 * | 8/2004 | Yamamoto et al. ........ | 348/226.1 |

FOREIGN PATENT DOCUMENTS

| | | |
|---|---|---|
| JP | 3476400 | 4/2001 |
| JP | 2004-260574 | 9/2004 |

* cited by examiner

*Primary Examiner* — Timothy J Henn
*Assistant Examiner* — Usman Khan
(74) *Attorney, Agent, or Firm* — Cowan, Liebowitz & Latman, P.C.

(57) ABSTRACT

An image pickup apparatus capable of accurately detecting a flicker in a short time period without regard to a state of object and a photography scene. A signal processing circuit reads out an n-th line of an image subjected to collective reset/collective transfer readout, reads out an n-th line of an image subjected to rolling readout, and subtracts an output of a pixel section of a particular column of the n-th line of the image subjected to the rolling readout from an output of a corresponding pixel section of the image subjected to the collective reset/collective transfer readout. The signal processing circuit determines that a flicker is generated, if there is a differential value not less than a predetermined threshold value between each pair of outputs from the pixel sections of the same line and if there is a periodicity in an image vertical direction.

10 Claims, 9 Drawing Sheets

IMAGE PICKUP APPARATUS AND FLICKER DETECTION METHOD THEREFOR

BACKGROUND OF THE INVENTION

1. Field of the Invention

The present invention relates to an image pickup apparatus and a flicker detection method therefor for detecting a flicker of signals, which are read out from an image pickup device during moving image photography.

2. Description of the Related Art

An image pickup apparatus such as a digital camera uses as a solid image pickup device a CMOS image sensor designed for low-voltage operation and low power consumption, which recently has been used much more frequently.

Photographed images obtained by an image pickup apparatus are affected by a flicker of a fluorescent lamp or other blinking light source, if any, in photography circumstance. Especially in a CMOS image sensor in which pixel signals are read out in sequence on a scan line basis, a readout start time varies between scan lines and exposure time differs therebetween, as conventionally known.

A flicker generated in line-by-line scanning is a line flicker that causes an output to vary in a screen vertical direction as shown in FIG. 9. FIG. 9 shows an image in which a line flicker is seen.

To remove or suppress affections by a flicker, a flicker detection and correction method is known. For example, there has been proposed a method in which pixel signal levels obtained in one frame on a predetermined-number-of-lines basis are summed up, and a flicker is detected based on results of summation for lines at the same position in plural frames (see, Japanese Patent Publication No. 3476400). Another method has been proposed in which pixel signal levels are added up on a line basis in one frame to thereby calculate line brightness, and a period of variation in line brightness in a vertical direction is detected, whereby a flicker is detected (see, Japanese Laid-open Patent Publication No. 2004-260574).

However, the method disclosed in Japanese Patent Publication No. 3476400 requires photographed images of two or more frames and uses summation values for plural frames in order to detect a flicker, and therefore it takes long processing time and a photographing time becomes long accordingly.

In addition, a time difference is inevitably produced between a time point of photographing to obtain an image for flicker detection and a time point of photographing to obtain an actual photographed image. If a state of flicker varies during the time difference, there is a fear that a flicker pattern cannot accurately be removed.

With the method disclosed in Japanese Laid-open Patent Publication No. 2004-260574, a flicker pattern can accurately be detected based on signal amplitudes in a case where an object has a "uniform brightness surface" as shown in FIG. 9. In actuality, however, there are various objects in a photographing screen and an object of a "uniform brightness surface" is hardly present therein. It is therefore usually difficult to detect a flicker pattern of a photographed image based on the image.

SUMMARY OF THE INVENTION

The present invention provides an image pickup apparatus and a flicker detection method therefor, which are capable of accurately detecting a flicker in a short time period without regard to a state of object and a photography scene.

According to a first aspect of this invention, there is provided an image pickup apparatus having an image pickup device including a plurality of two-dimensionally arranged pixel sections, each of which has a photoelectric conversion part for generating electric charge by photoelectric conversion and has a floating diffusion part for storing the generated electric charge, comprising a collective reset unit adapted to perform collective resetting of the photoelectric conversion parts and the floating diffusion parts of the plurality of two-dimensionally arranged pixel sections, a collective transfer unit adapted to collectively transfer electric charges stored in the photoelectric conversion parts to the floating diffusion parts after elapse of a predetermined time period from the collective resetting, a sequential reset unit adapted to perform, on a predetermined-number-of-pixel-sections basis, sequential resetting of the photoelectric conversion parts and the floating diffusion parts of the plurality of two-dimensionally arranged pixel sections, a sequential transfer unit adapted to perform, on the predetermined-number-of-pixel-sections basis, sequential transfer of the electric charges stored in the photoelectric conversion parts to the floating diffusion parts after elapse of a predetermined time period from the sequential resetting, and a detection unit adapted to calculate differential information based on pixel signals obtained by the collective transfer unit and the sequential transfer unit and detect a flicker based on the calculated differential information.

According to a second aspect of this invention, there is provided a flicker detection method for an image pickup apparatus having an image pickup device including a plurality of two-dimensionally arranged pixel sections, each of which has a photoelectric conversion part for generating electric charge by photoelectric conversion and has a floating diffusion part for storing the generated electric charge, comprising a collective reset step of performing collective resetting of the photoelectric conversion parts and the floating diffusion parts of the plurality of two-dimensionally arranged pixel sections, a collective transfer step of collectively transferring electric charges stored in the photoelectric conversion parts to the floating diffusion parts after elapse of a predetermined time period from the collective resetting, a sequential reset step of performing, on a predetermined-number-of-pixel-sections basis, sequential resetting of the photoelectric conversion parts and the floating diffusion parts of the plurality of two-dimensionally arranged pixel sections, a sequential transfer step of performing, on the predetermined-number-of-pixel-sections basis, sequential transfer of the electric charges stored in the photoelectric conversion parts to the floating diffusion parts after elapse of a predetermined time period from the sequential resetting, and a detection step of calculating differential information based on pixel signals obtained in the collective transfer step and the sequential transfer step and detecting a flicker based on the calculated differential information.

With the image pickup apparatus and the flicker detection method of this invention, differential information is calculated based on pixel signals obtained by the collective transfer unit and the sequential transfer unit, and a flicker is detected based on the calculated differential information, whereby a flicker can accurately be detected in a short time period without regard to a state of object and a photography scene.

Further features of the present invention will become apparent from the following description of exemplary embodiments with reference to the attached drawings.

DETAILED DESCRIPTION OF THE PREFERRED EMBODIMENTS

The present invention will now be described in detail below with reference to the drawings showing preferred embodiments thereof.

First Embodiment

Figure 1:
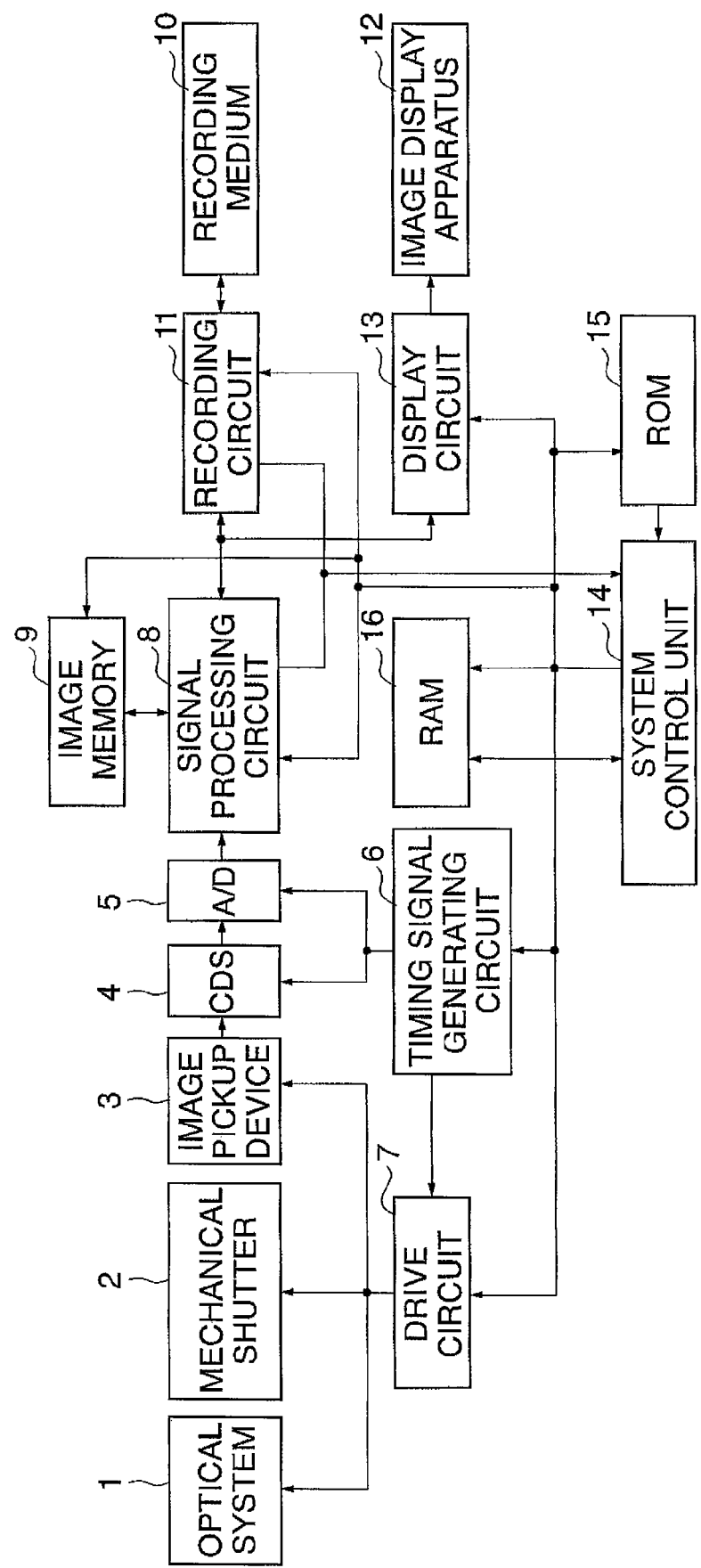
FIG. 1 is a block diagram showing the construction of an image pickup apparatus of a first embodiment of this invention.

FIG. 1 is a block diagram showing the construction of an image pickup apparatus according to a first embodiment. The image pickup apparatus of this embodiment is applied to a digital camera, which is able to selectively carry out moving image photography or still image photography.

The image pickup apparatus includes an optical system 1 comprised of lenses and an aperture, a focal-plane mechanical shutter 2, and an image pickup device 3. When a still image photography mode is selected by a photography mode selector SW (not shown) for selecting either moving image photography mode or still image photography mode, the mechanical shutter 2 controls an exposure time of the image pickup device 3 by differentiating running times of front and rear shutter blades. When the moving image photography mode is selected, the mechanical shutter 2 is made fully open, whereby light is always guided to the image pickup device 3.

The image pickup device 3 is a CMOS image sensor. In this embodiment, the image pickup device 3 is configured to be able to carry out rolling readout and collective reset/collective transfer readout. A flicker can be detected based on pixel information obtained by these different readout methods, as described later.

The image pickup apparatus includes a CDS circuit 4 for analog signal processing, an A/D converter 5 for converting an analog signal into a digital signal, and a timing signal generating circuit 6. The timing signal generating circuit 6 is adapted to generate signals for use in operating the image pickup device 3, the CDS circuit 4, and the A/D converter 5. The image pickup apparatus further includes a drive circuit 7 for driving the optical system 1, the mechanical shutter 2, and the image pickup device 3, and also includes a signal processing circuit 8 for performing required signal processing on photographed image data, and an image memory 9 for storing the signal-processed image data.

The image pickup apparatus further includes an image recording medium 10 detachably mounted thereto, a recording circuit 11 for recording signal-processed image data into the image recording medium 10, an image display apparatus 12 for displaying the signal-processed image data, and a display circuit 13 for displaying images on the image display apparatus 12. Furthermore, the image pickup apparatus includes a system control unit 14 for controlling the entire image pickup apparatus, a nonvolatile memory (ROM) 15, and a volatile memory (RAM) 16.

In the nonvolatile memory (ROM) 15, there are stored a program for executing a control method by the system control unit 14 and control data such as parameters and tables for use when the program is executed. The program, control data, and correction data stored in the nonvolatile memory 15 are transferred to the volatile memory (RAM) 16 and stored therein. The volatile memory (RAM) 16 is used by the system control unit 14 in controlling the image pickup apparatus.

The following is a description of an operation performed by the image pickup apparatus having the above construction when the moving image photography mode is selected. It is assumed that prior to a photographing operation, the required program, control data, etc., are transferred from the nonvolatile memory 15 to the volatile memory 16 and stored therein at start of operation of the system control unit 14, for example when the electric power to the image pickup apparatus is turned on. The program and data are used by the system control unit 14 in controlling the image pickup apparatus. Where required, the system control unit 14 transfers additional program and data from the nonvolatile memory 15 to the volatile memory 16, directly reads out data from the nonvolatile memory 15, and uses the same.

The drive circuit 7 first drives the optical system 1 comprised of an aperture and lenses and fully opens the mechanical shutter 2 in accordance with a control signal supplied from the system control unit 14. The optical system 1 forms an object image having an appropriate brightness on the image pickup device 3.

In accordance with drive pulses based on operation pulses generated by the timing signal generating circuit 6 under the control of the system control unit 14, the image pickup device 3 is driven and converts by photoelectric conversion the object image into electrical signals, which are output as analog image signals. A method for driving the image pickup device 3 will be described later.

In accordance with the operation pulses generated by the timing signal generating circuit 6 controlled by the system control unit 14, clock-synchronous noise in the analog image signals output from the image pickup device 3 is removed by the CDS circuit 4, and the analog image signals are converted by the A/D converter 5 into digital image signals.

The digital image signals are temporarily stored in the image memory 9, and then subjected to image processing (such as color conversion, white balance, and gamma correction), resolution conversion processing, image compression processing, etc., in the signal processing circuit 8 controlled by the system control unit 14.

The image memory 9 is for temporarily storing the digital image signals being signal-processed and for storing image data, i.e., signal-processed digital image signals. The image data signal-processed in the signal processing circuit 8 or image data stored in the image memory 9 is converted by the recording circuit 11 into data suited to the image recording medium 10 (for example, file system data with hierarchic structure), and recorded in the image recording medium 10. The image data subjected to the resolution conversion processing in the signal processing circuit 8 is converted by the display circuit 13 into signals suited to the image display apparatus 12 (such as for example, analog signals of NTSC system), and displayed on the image display apparatus 12.

If there is a request from the system control unit 14, the signal processing circuit 8 outputs digital image signals and image data information generated in the signal processing to the system control unit 14. For example, information such as spatial frequency of image, average value in a designated region, and data amount of compressed image, or information extracted from these information are output from the signal processing unit 8. The signal processing circuit 8 also carries out calculations on image signals obtained in the CMOS image sensor 3 by a different readout method, thereby generating flicker information. Based on the flicker information, the signal processing circuit 8 performs image correction for each line, thereby implementing image processing to reduce affections by a flicker. If there is a request from the system control unit 14, the recording circuit 11 outputs information representing the type and free space of the image recording medium 10 to the system control unit 14.

The following is a description of a reproducing operation performed in a case that image data is recorded in the image recording medium 10. In accordance with a control signal from the system control unit 14, the recording circuit 11 reads out the image data from the image recording medium 10. If the image data is compressed image, the signal processing circuit 8 performs image decompression processing on the image data in accordance with a control signal from the system control unit 14, and stores the decompressed image data into the image memory 9. The image data stored in the image memory 9 is subjected to resolution conversion processing in the signal processing circuit 8, and converted by the display circuit 13 into signals suited to the image display apparatus 12, which are displayed on the image display apparatus 12.

Figure 2:
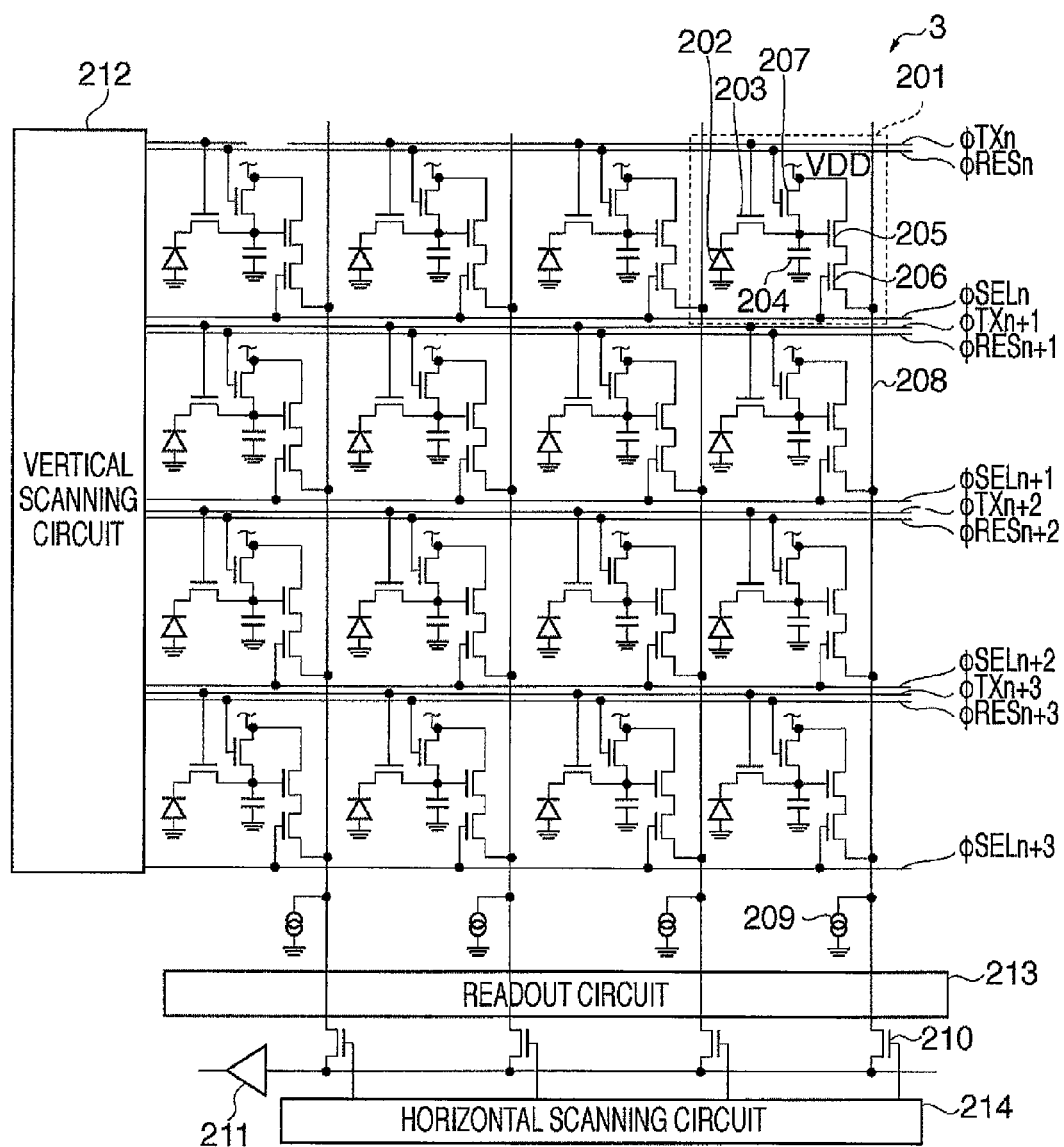
FIG. 2 is a view schematically showing the construction of an image pickup device of the image pickup apparatus.

Next, the CMOS image sensor 3 and a method for driving the same according to the first embodiment will be described in detail. FIG. 2 schematically shows the construction of the CMOS image sensor 3. For simplification of illustration, a pixel structure shown in FIG. 2 only includes a 4×4 array of unit pixels (pixel sections) 201. In actuality, however, a large number of pixel sections are two-dimensionally arranged to form a photographing screen.

The pixel sections 201 each include a photodiode (hereinafter referred to as the PD) 202 that converts light into an electric charge. In accordance with a transfer pulse φTX, transfer switches 203 transfer electric charges generated in the PDs 202 to storage regions (hereinafter referred to as the FDs) 204. The FDs 204 temporarily store the electric charges. Amplification MOS amps 205 function as source followers. Selection switches 206 each select a pixel section in accordance with a selection pulse φSEL. Reset switches 207 remove the electric charges stored in the FDs 204 in accordance with a reset pulse φRES.

The FDs 204 and the amplification MOS amps 205 cooperate with constant current sources 209 to form floating diffusion amplifiers. The signal electric charge in one pixel section selected by the selection switch 206 is converted into a voltage, which is output via a signal output line 208 to a readout circuit 213.

Each of the constant current sources 209 is a load of the amplification MOS amp 205. Horizontal selection switches 210 are driven by a horizontal scanning circuit 214, and each select one of output signals from the readout circuit 213. The output signal from the readout circuit 213 is output by an output amplifier 211 to the outside of the image pickup device 3. A vertical scanning circuit 212 is for selecting desired ones of the switches 203, 206 and 207.

Among pulse signals φTX, φRES, and φSEL, pulse signals applied to an n-th scan line selected by the vertical scanning circuit 212 will be referred to as φTXn, φRESn, and φSELn, respectively.

Next, an operation for driving the image pickup device in the moving image photography mode will be described. In this embodiment, a rolling readout operation and a collective reset/collective transfer readout operation are performed in driving the image pickup device 3. A flicker can be detected based on a difference of result of output, which is caused due to a difference in driving method between the rolling readout operation and the collective reset/collective transfer readout operation.

Figure 3:
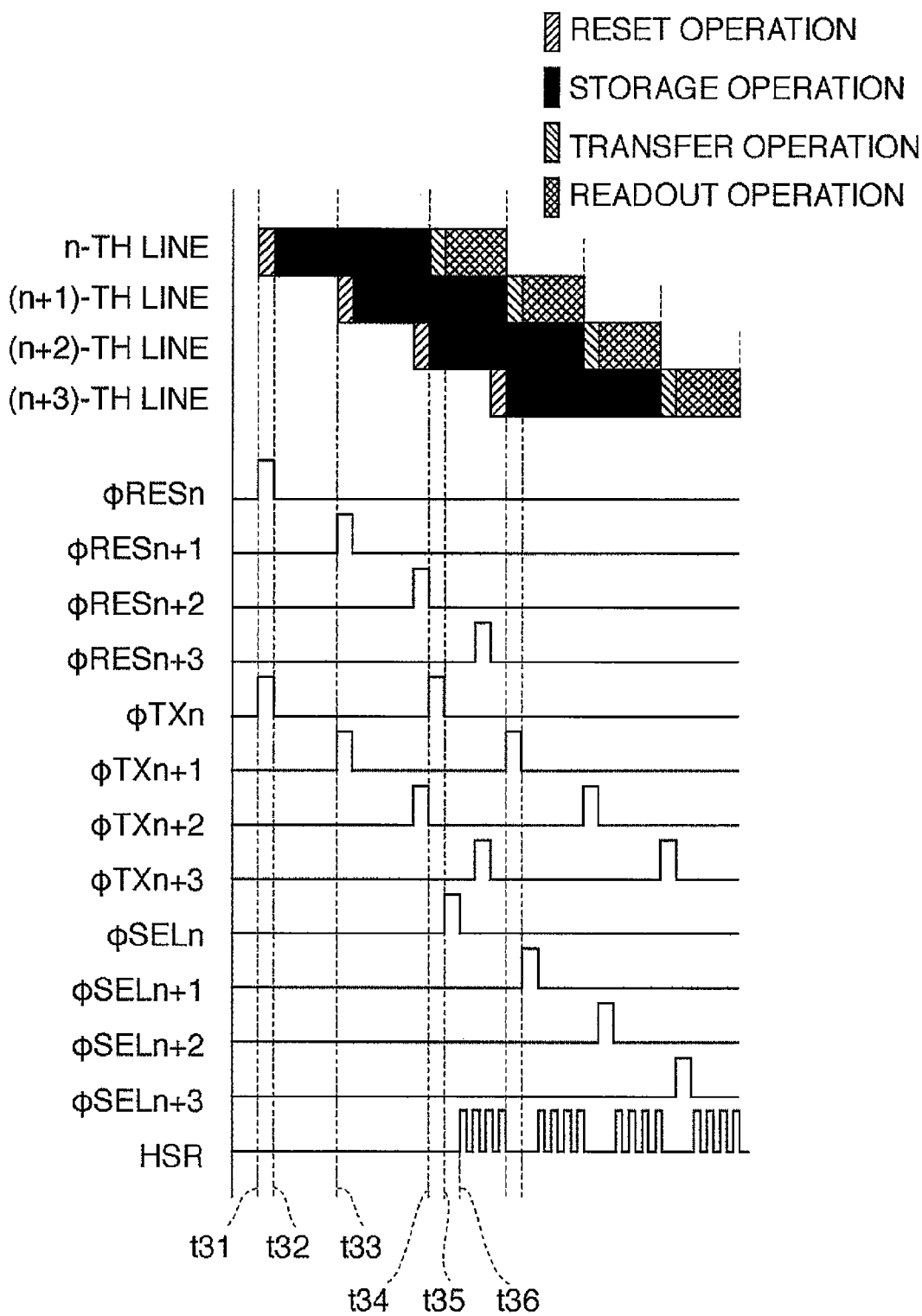
FIG. 3 is a timing chart showing how the image pickup device is driven in a rolling readout operation.

FIG. 3 shows in timing chart how the image pickup device 3 is driven in the rolling readout operation. In FIG. 3, an illustration is given in relation to the n-th to (n+3)-th lines, which are scanned and selected by the vertical scanning circuit 112.

In a time period from a time point t31 to a time point t32, the vertical scanning circuit 212 applies the transfer pulse φTXn and the reset pulse φRESn to respective ones of the transfer switches 203 and the reset switches 207 of the pixel sections of the n-th line, whereby the transfer switches 203 and the reset switches 207 are turned on. As a result, a rest operation is carried out for removing unnecessary electric charges stored in the PDs 202 and the FDs 204 of the pixel sections of the n-th line.

At the time point t32, the transfer switches 203 are turned off, and a storage operation for storing optical electric charges generating in the PDs 202 is started.

Next, at a time point t34, the vertical scanning circuit 212 applies the transfer pulse φTXn to the transfer switches 203 for turning on these transfer switches 203. As a result, a transfer operation is performed to transfer the optical electric charges stored in the PDs 202 of the pixel sections of the n-th line to the FDs 204.

It should be noted that it is necessary to turn off the reset switches 207 prior to the transfer operation. At the time point t32 in FIG. 3, the reset switches 207 and the transfer switches 203 are simultaneously turned off. A storage time period starts at the time point t32 and ends at the time point t34.

After completion of the operation for transferring pixel signals from the pixel sections of the n-th line, the selection pulse φSELn is applied to the selection switches 206 at a time point t35. When the selection switches 206 are turned on, the electric charges held in the FDs 204 are each converted into a voltage, which is output to the readout circuit 213. From a time point t36, pixel signals of respective columns of the n-th line temporarily held in the readout circuit 213 are sequentially output by the horizontal scanning circuit (HSR) 214. It should be noted that t33 represents a start time of application of the reset and transfer pulses to the pixel sections of the (n+1)-th line.

Figure 4:
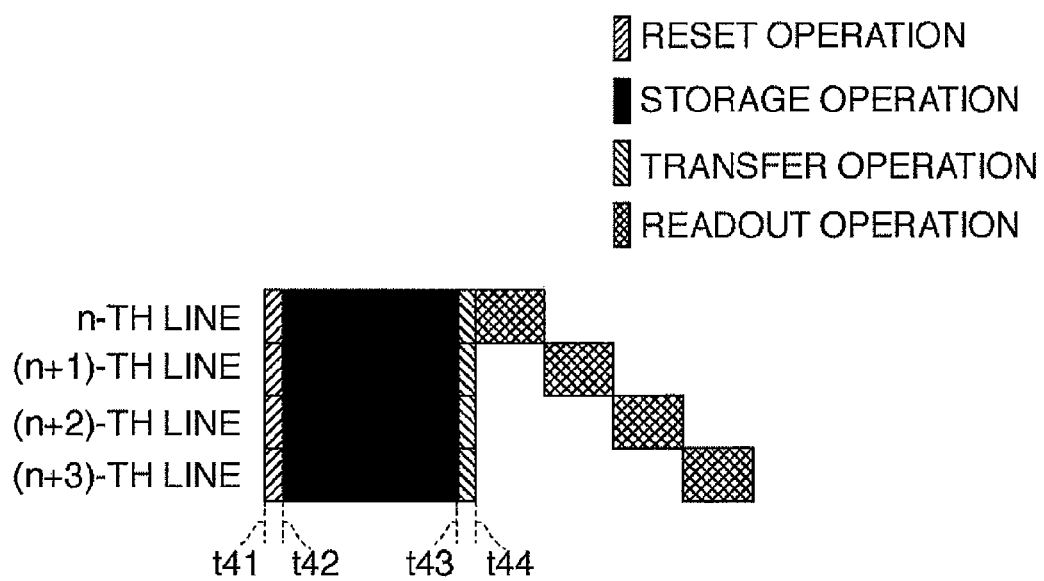
FIG. 4 is a timing chart showing how the image pickup device is driven in a collective reset/collective transfer readout operation.

FIG. 4 shows in timing chart how the image pickup device 3 is driven in the collective reset/collective transfer readout operation. In FIG. 4, a reset operation is performed simultaneously for all the lines during a time period from a time point t41 to a time point t42. During a time period from a time point t43 to a time point t44, a transfer operation is performed simultaneously for all the lines.

In the rolling readout operation in FIG. 3, pixel signals are sequentially read out on a scan line basis. Since the exposure time is different between scan lines, there is generated a line flicker that causes an output variation in a screen vertical direction (see FIG. 8). On the other hand, in the collective reset/collective transfer readout operation in FIG. 4, the exposure time is the same between all the pixel sections, and therefore no line flicker is generated. By performing these readout operations on photographed images of two frames, pixel signals can be obtained by the rolling readout and the collective reset/collective transfer readout. The signal processing circuit 8 performs calculation processing on the thus read-out pixel signals, thereby detecting flicker information.

Figure 5:
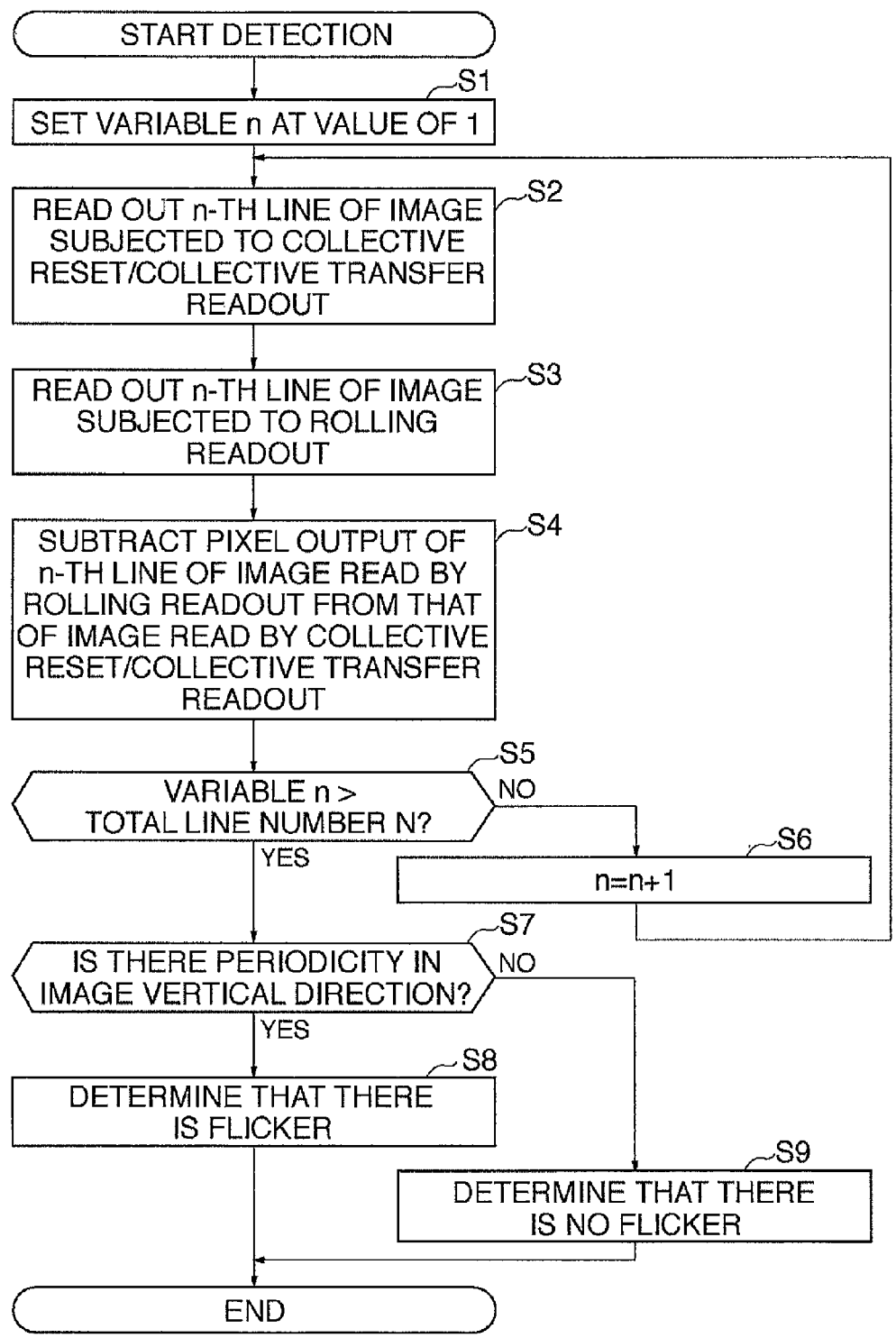
FIG. 5 is a flowchart showing the procedures of a flicker information detection process implemented by a signal processing circuit of the image pickup apparatus.

FIG. 5 shows in flowchart the procedures of a flicker information detection process executed by the signal processing circuit 8. First, the signal processing circuit 8 sets a variable n at a value of 1 (step S1). Then, the signal processing circuit 8 reads out the n-th line of an image stored in the image memory 9 and subjected to the collective reset/collective transfer readout (step S2). The signal processing circuit 8 reads out the n-th line of an image stored in the image memory 9 and subjected to the rolling readout (step S3).

The signal processing circuit 8 subtracts a pixel output of a particular column of the n-th line of the image read out by the rolling readout from that of the image read out by the collective reset/collective transfer readout (step S4). As a result of this subtraction, there is obtained a difference value between these two pixel outputs at the same position on the photographed screen, and the difference value is stored into the image memory 9.

The signal processing circuit 8 determines whether or not the variable n exceeds a total line number N (step S5). If it is determined that the variable n does not exceed the total line number N, the signal processing circuit 8 adds a value of 1 to the variable n (step S6), whereupon the flow returns to step S2 in which the above described processing is executed.

On the other hand, if it is determined that the variable n exceeds the total line number N, the signal processing circuit 8 determines whether or not there is a periodicity in an image vertical direction (step S7). To this end, referring to the difference values at respective lines stored in the image memory 9, the signal processing circuit 8 determines whether or not the difference values are each equal to or larger than a predetermined threshold value, and determines whether or not there is a periodicity in the difference values in the direction perpendicular to the lines subjected to sequential transfer.

If there is a periodicity in the difference values in the image vertical direction, the signal processing circuit 8 determines that there is a flicker (step S8), and the present process is completed. On the other hand, if there is no periodicity in the difference values in the image vertical direction, the signal processing circuit 8 determines that there is no flicker (step S9) and completes the process.

As described above, the signal processing circuit 8 performs calculation on the read out pixel signals and detects flicker information. In the calculation, the signal processing circuit 8 carries out, on a line-by-line basis, subtraction between outputs obtained from the pixel sections by the collective reset/collective transfer readout and outputs obtained therefrom by the rolling readout. As a result of the subtraction, if there is a difference not less than the predetermined threshold value between each output pair and if there is a periodicity in the differences (differential information) in the direction perpendicular to the lines subjected to sequential transfer of electric charges, the signal processing circuit 8 determines that there are affections by a flicker.

In a case where there is a flicker, if there is a readout time difference between pixel signal groups read out on a line basis, a flicker due to the readout time difference is added to each pixel signal group. On the other hand, if there is no readout time difference between the pixel signal groups, no flicker is added to each pixel signal group. A flicker can therefore be detected by detecting the readout time difference.

As described above, the rolling readout and the collective reset/collective transfer readout are performed on photographed images of two frames in reading out the pixel signals from the CMOS image sensor in the image pickup apparatus of the first embodiment. Of course, these readout may be performed on photographed images of two fields. Flicker information can be detected based on differential information on pixel outputs, which can be obtained from a readout time difference in reading out the pixel signals by the readout methods. Thus, a flicker can be detected in a short time period with more accuracy without regard to a state of object and photography scene. Further, it is possible to eliminate affections by the flicker.

In addition, the differential information can be calculated in a wide area on the photography screen, thereby improving the accuracy of flicker detection. Since the differential information is calculated at pixel sections at the same position on the photography screen, making it possible to more accurately detect the differential information.

Second Embodiment

In a second embodiment, the CMOS Image sensor 3, which is an image pickup device, is able to use different readout methods between a part of the pixel sections and the other pixel sections. More specifically, in this embodiment, the image pickup device 3 includes pixel sections for which the rolling readout can be made and pixel sections for which the collective reset/collective transfer readout can be made. The construction of the image pickup apparatus of the second embodiment is similar to that of the first embodiment, and therefore a description thereof will be omitted.

Figure 6:
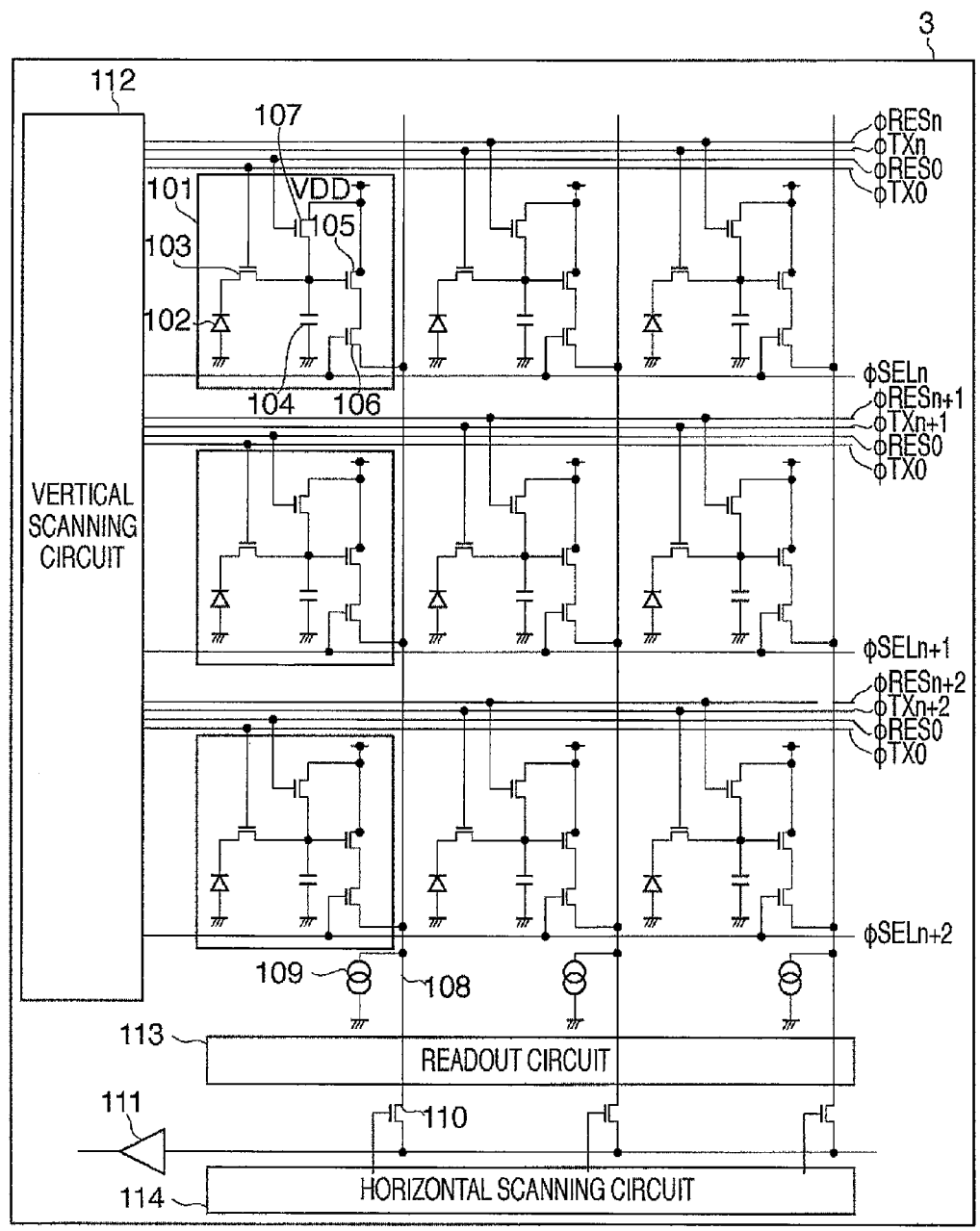
FIG. 6 is a view schematically showing the construction of an image pickup device according to a second embodiment of this invention.

A detailed description will be given of the CMOS image sensor 3 and a drive method therefor of the second embodiment. FIG. 6 schematically shows the construction of the CMOS image sensor 3. For simplification of illustration, there is shown in FIG. 6 a pixel structure in which a 3×3 array of unit pixels (pixel sections) 101 is arranged, however, a large number of pixel sections are two-dimensionally arranged to form a photography screen in actuality.

As shown in FIG. 6, pixel sections located in a leftmost column differ from the other pixel sections in that transfer switches 103 and reset switches 107 thereof are respectively supplied at their gates with a transfer pulse φTX0 and a reset pulse φRES0. Since the pixel sections in the leftmost column do not belong to a region from which image data is output, a difference in drive method of the pixel sections at the leftmost column from that of the other pixel sections does not produce any problems.

A photodiode (PD) 102 of each pixel section functions as a photoelectric conversion part for converting light into electric charge. In accordance with the transfer pulse φTX0 and a transfer pulse φTX, the transfer switches 103 of the pixel sections in the leftmost column and the transfer switches 103 of the other pixel sections respectively transfer electric charges generated by the PDs 102 to storage regions 104. The storage regions (FD) 104, which are floating diffusion parts, temporarily store electric charges. Amplification MOS amps 105 function as source followers.

Selection switches 106 are for selecting pixel sections in accordance with selection pulses φSEL. Reset switches 107 of the pixel sections at the leftmost column and reset switches 107 of the other pixel sections respectively remove electric charges stored in the FDs 104 in accordance with reset pulses φRES0 and reset pulses φRES.

The FDs 104 and the amplification MOS amps 105 cooperate with constant current sources 109 to constitute floating diffusion amplifiers. A signal electric charge stored in a pixel section selected by a corresponding selection switch 106 is converted into a voltage, which is output to a readout circuit 113 via a signal output line 108. The constant current sources 109 are loads of the amplification MOS amps 105.

Column selection switches 110 driven by a horizontal scanning circuit 114 each select an output signal of the readout circuit 113. An output amplifier 111 outputs the output signal of the readout circuit 113 to the outside of the image pickup device 3. A vertical scanning circuit (shift register) 112 is for selecting switches 103, 106, and 107. The readout circuit 113 temporarily holds output signals produced at the signal output lines 108. Pixel outputs, which are output from the readout circuit 113 on a column-by-column basis, are sequentially output by the horizontal scanning circuit 114 to the output amplifier 111.

Among pulse signals φTX, φRES, and φSEL, pulse signals applied to an n-th scan line selected by the vertical scanning circuit 112 are hereinafter denoted by. φTXn, φRESn, and φSELn, respectively. The same pulse signals φTX0 and φRES0 are applied to the scan lines without regard to the scan line number "n".

Figure 7:
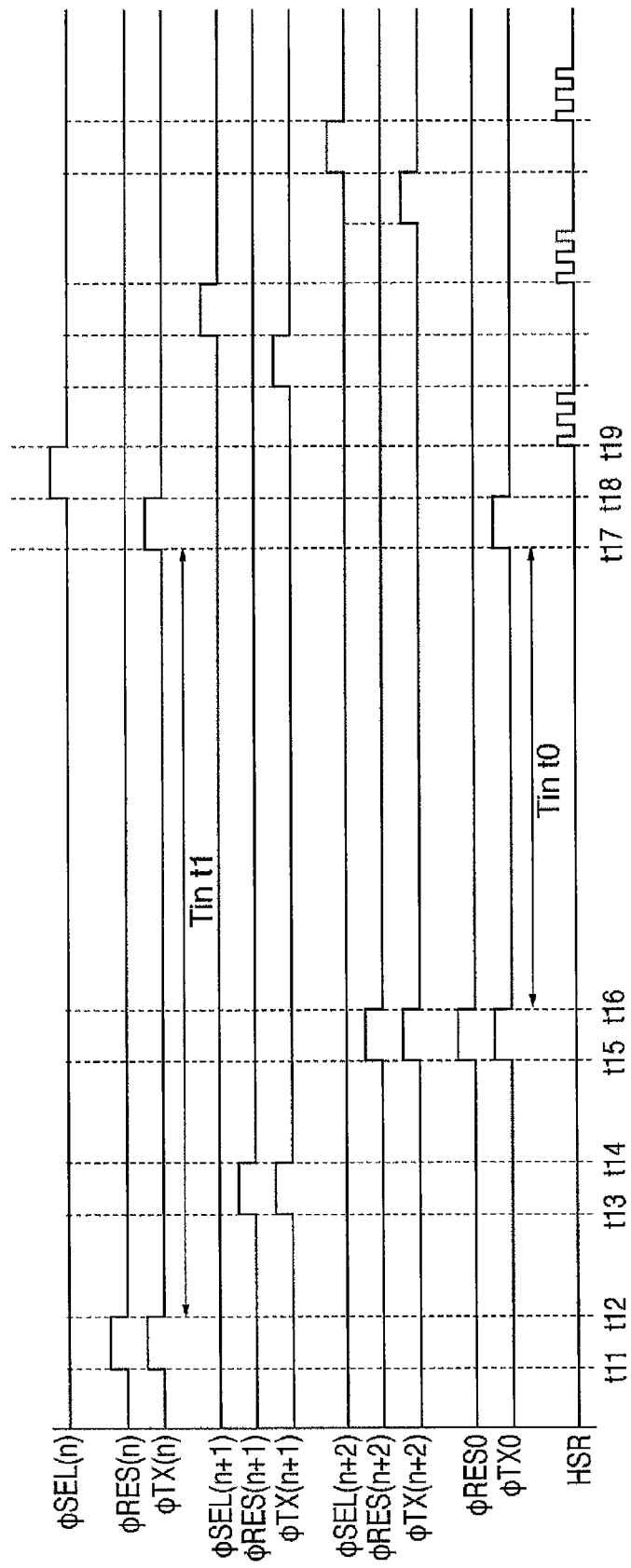
FIG. 7 is a timing chart showing an operation for driving the image pickup device.

Next, a description will be given of an operation for driving the image pickup device in the moving image photography mode. FIG. 7 shows in timing chart how the image pickup device 3 is driven. In this embodiment, the pixel sections of the CMOS image sensor 3 in one frame are divided into pixel sections subjected to the rolling readout and pixel sections subjected to the collective reset/collective transfer readout. A flicker can be detected based on a difference of result of output, which is caused due to a difference in drive method between these two groups of pixel sections.

First, a description will be given of how the pixel sections other than those of the leftmost column subjected to rolling readout are driven. In a time period from a time point t11 to a time point t12, the vertical scanning circuit 112 applies the reset pulse φRESn and the transfer pulse φTXn to the pixel sections of the n-th line, thereby turning on the transfer switches 103 and the reset switches 107. Then, the vertical scanning circuit 112 performs a reset operation to remove unnecessary electric charges stored in the PDs 102 and the FDs 104 of the pixel sections other than those of the leftmost column.

At the time point t12, the transfer switches 103 are turned off, and a storage operation for storing, for a predetermined time period Tint1, optical electric charges generating in the PDs 102 is started. The PDs 102 for which the storage operation is started are located at the columns other than the leftmost column. For the PDs 102 located at the leftmost column, the storage of optical electric charges is started in timing described later.

Next, at a time point t17 after elapse of the predetermined time period Tint1, the vertical scanning circuit 112 applies the transfer pulse φTXn to the transfer switches 103 for turning on these transfer switches, whereby a transfer operation is performed to transfer the optical electric charges stored in the PDs 102 to the FDs 104.

It should be noted that it is necessary to turn off the reset switches 107 prior to the transfer operation, and therefore the reset switches 107 and the transfer switches 103 are simultaneously turned off at the time point t12. For the pixel sections on the columns other than the leftmost column, a storage time period is equal to the predetermined time period Tint1 from the time point t12 (at completion of the reset operation) to the time point t17 (at completion of transfer operation).

After completion of the operation for transferring pixel signals from the pixel sections of the n-th line, the vertical scanning circuit 112 applies the selection pulse φSELn to the selection switches 106 at a time point t18, thereby turning on the selection switches 106. As a result, the electric charges held in the FDs 104 are each converted into a voltage, which is output to the readout circuit 113. From a time point t19, pixel signals of respective columns of the n-th line temporarily held in the readout circuit 113 are sequentially output by the horizontal scanning circuit (HSR) 114.

After the reset pulse φTXn is applied to the pixel sections of the n-th line, the same operation as that for the pixel sections of the n-th line is performed for those of the (n+1)-th line. At a time point t13, i.e., after elapse of the predetermined time period, the reset pulse and the transfer pulse are started to be applied to the pixel sections of the (n+1)-th line. The application of the reset and transfer pulses is completed at a time point t14, and then electric charges are stored in the pixel sections for the predetermined time period Tint1. Subsequently, pixel signals are sequentially read out from the pixel sections of respective columns of the (n+1)-th line. At a time point t15, the reset pulse and the transfer pulse are started to be applied to the pixel sections of the (n+2)-th line.

On the other hand, the pixel sections of the leftmost column are subjected to the collective reset/collective transfer readout. In the following, a description will be given of how the pixel sections located at the leftmost column or located within a predetermined region are driven. First, a reset operation is not carried out on a particular line, but carried out simultaneously on all the lines.

In the time period from the time point t15 to the time point t16, the vertical scanning circuit 112 applies the reset pulse φRES0 and the transfer pulse φTX0 to the pixel sections at respective lines located at the leftmost column, thereby turning on the transfer switches 103 and reset switches 107 of these pixel sections. Then, the vertical scanning circuit 112 performs a reset operation to remove unnecessary electric charges stored in the PDs 102 and the FDs 104. The reset operation is performed simultaneously on the pixel sections of all the lines.

At the time point t16, the transfer switches 103 are turned off, and a storage operation for storing, for a predetermined time period Tint0, optical electric charges generating in the PDs 102 is started.

Next, at the time point t17 after elapse of the predetermined time period Tint0, the vertical scanning circuit 112 applies the transfer pulse φTX0 to the transfer switches 103 for turning on these transfer switches, whereby a transfer operation is performed to transfer the optical electric charge stored in the PDs 102 to the FDs 104. The transfer operation is performed simultaneously on the pixel sections of all the lines.

The timing at which the operation for transfer of optical electric charges from the pixel sections of all the lines is completed and the timing at which the pixel signal is read out from the pixel section at each line are the same as those for the pixel sections for which the rolling readout is performed. Specifically, the pixel signal of the pixel section of each of the lines subjected to the collective reset/corrective transfer readout is temporarily held in the FD 104 and then read out from the FD 104 to the readout circuit 113 at the same timing as that at which the pixel signals are read out from the pixel sections of the same line which are subjected to the rolling readout. The thus obtained pixel signals are the same between the all the lines in terms of readout time point of pixel signals from respective lines and in terms of time period and start/end time points of storage of electrical charges.

With the above described operation for driving the image pickup device, there can be obtained the pixel signals subjected to the rolling readout and the pixel signals subjected to the collective reset/collective transfer readout.

The signal processing circuit 8 carries out calculations on the thus read out pixel signals for detection of flicker information. In the calculations, the signal processing circuit 8 performs, on a line basis, subtractions between the outputs (pixel signals) of the pixel sections located at the leftmost column and subjected to the collective reset/collective transfer readout and the outputs (pixel signals) of the pixel sections close to those of the leftmost column and subjected to the rolling readout. As a result of the subtractions, if there is a difference not less than a predetermined threshold value between each pair of pixel signals and if there is a periodicity in the differences (differential information) in the direction perpendicular to the lines subjected to sequential transfer of electric charges, the signal processing circuit 8 determines that there are affections by a flicker.

In a case where there is a flicker, if there is a readout time difference between pixel signal groups read out on a line basis, a flicker due to the readout time difference is added to each pixel signal group. On the other hand, if there is no readout time difference between the pixel signal groups, no flicker is added to each pixel signal group. A flicker can therefore be detected by performing the subtractions to thereby calculate differential information. In addition, by using the outputs of adjacent pixel sections for each subtraction, the differential information required for the flicker detection can easily be obtained. As described above, the flicker detection can be carried out with ease, and affections by the flicker can be removed by subtracting a detected amount of flicker from the pixel signals of each line.

Figure 8:
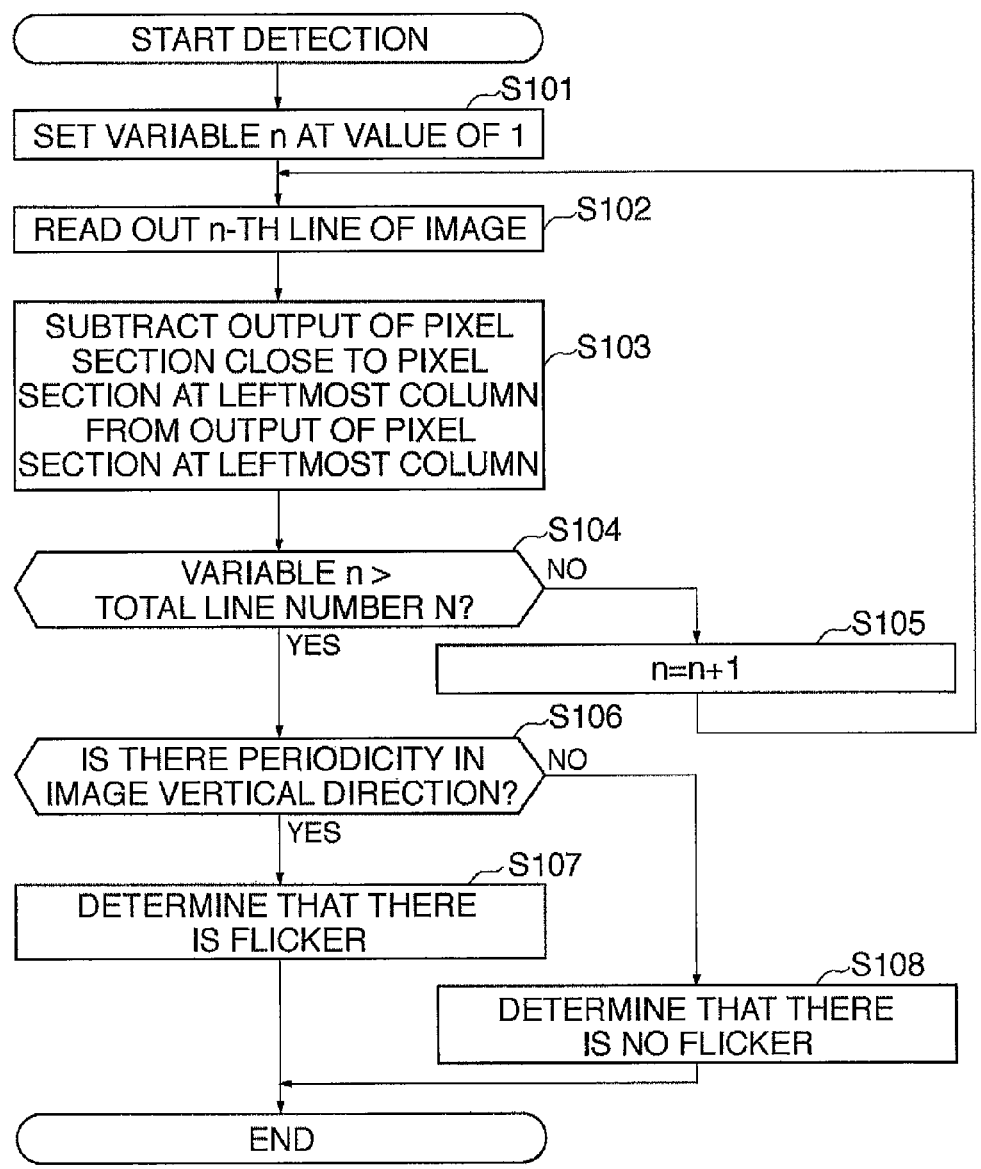
FIG. 8 is a flowchart showing the procedures of a flicker information detection process implemented by a signal processing circuit of the second embodiment.
Figure 9:
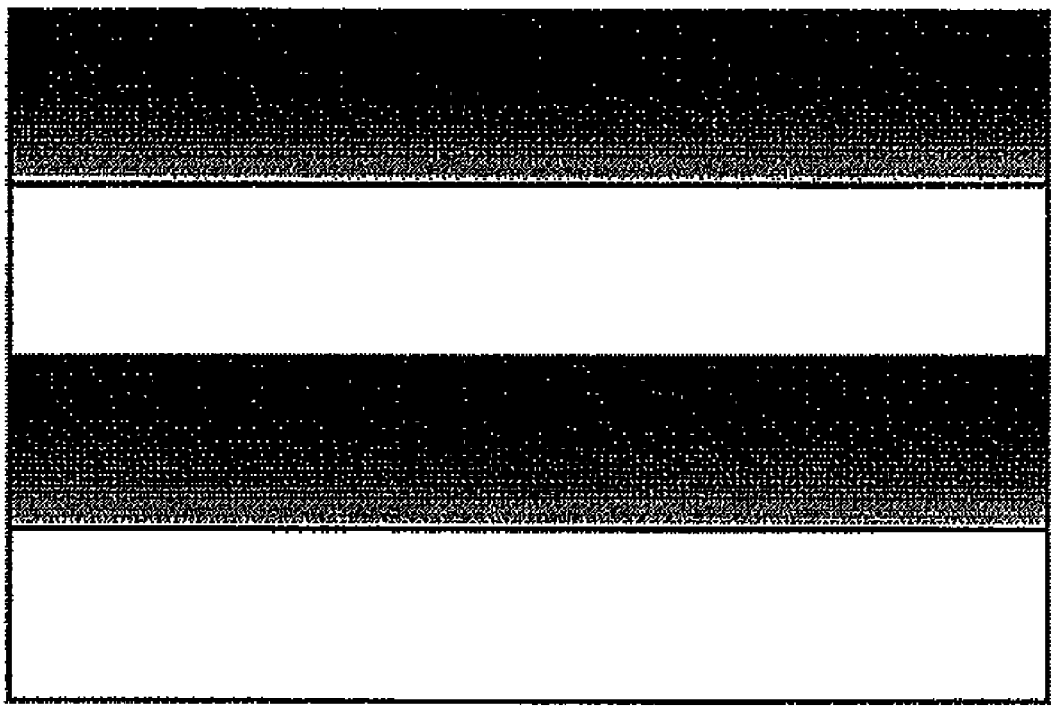
FIG. 9 is a view showing an image in which a line flicker is generated.

FIG. 8 shows in flowchart the procedures of the flicker information detection process in the signal processing circuit 8. Steps S101 and S104-S108 in FIG. 8 respectively correspond to steps S1 and S5-S9 in FIG. 5. First, a variable n is set at a value of 1 (step S101), and the n-th line of a photographed image stored in the image memory 9 is read out (step S102).

Then, an output of that pixel section of the n-th line (pixel output subjected to the rolling readout) which is close to the pixel section located at the leftmost column of the n-th line is subtracted from an output of the pixel section at the leftmost column (pixel output subjected to the collective reset/collective transfer readout) (step S103). As a result of the subtraction, a difference value between these two pixel outputs is obtained and stored into the image memory 9.

Next, it is determined whether or not the variable n exceeds a total line number N(step S104). If the variable n does not exceed the total line number N, a value of 1 is added to the variable n (step S105).

On the other hand, if the variable n exceeds the total line number N, it is determined whether or not there is a periodicity in an image vertical direction (step S106).

If there is a periodicity in the difference value in the image vertical direction, it is determined that there is a flicker (step S107). On the other hand, if there is no periodicity in the difference value in the image vertical direction, it is determined that there is no flicker (step S108).

As described above, by reading out the pixel outputs from the CMOS image sensor 3 with use of different pixel driving methods, it is possible to detect flicker information from one photographed image on the basis of differential information on pixel output, which is obtainable from a difference in driving method.

In the above described embodiment, the pixel sections of the leftmost column are selected as the predetermined region of pixel sections subjected to the collective reset/collective transfer readout, but this is not limitative. The predetermined region may be comprised of pixel sections of at least one column located outside an effective pixel region to which light is guided. There is no particular limit on the position and the number of columns of pixel sections located outside the effective pixel region. It is therefore possible to detect a flicker with accuracy, while ensuring the effective pixel region.

In the case of an image pickup apparatus for performing image photographing using a column-thinning method, a thinned column may be allocated for a column of pixel sections subjected to the collective reset/collective transfer readout, whereas an unthinned column may be allocated for a column of pixel sections subjected to the rolling readout. With this arrangement, a flicker can be detected. Thus, the effective pixel region can effectively be used, and a pixel region subjected to the collective reset/collective transfer readout is unnecessary to be provided separately from the effective pixel region.

In the case of an image pickup apparatus for performing image photographing using a line-thinning method, a thinned line may be allocated for a line of pixel sections subjected to the collective reset/collective transfer readout, whereas an unthinned line may be allocated for a line of pixel sections subjected to the rolling readout. With this arrangement, a flicker can be detected. In this case, thinned lines can simultaneously be selected at the same timing by the vertical scanning circuit. It is unnecessary to use the reset pulse $\phi RES0$ and the transfer pulse $\phi TX0$ for the collective reset/collective transfer readout.

The image pickup apparatus of the second embodiment performs the rolling readout and the collective reset/collective transfer readout on one photographed image in reading out outputs from pixel sections in the CMOS image sensor 3, thereby making it possible to detect flicker information on the basis of differential information on pixel outputs, which are obtainable from a difference in driving methods. It is therefore possible to accurately detect a flicker in a short time period without regard to a state of object and a photography scene. In addition, affections by the flicker can be removed.

It is to be understood that the present invention may also be accomplished by supplying a system or an apparatus with a storage medium in which a program code of software, which realizes the functions of the above described embodiments is stored, and causing a computer (or CPU or MPU) of the system or apparatus to read out and execute the program code stored in the storage medium.

In this case, the program code itself read from the storage medium realizes the functions of the above described embodiments, and therefore the program code and the storage medium in which the program code is stored constitute the present invention.

Examples of the storage medium for supplying the program code include a flexible disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM.

Further, it is to be understood that the functions of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-293243 and 2007-293245, filed Nov. 12, 2007 which are hereby incorporated by reference herein in their entirety.

What is claimed is:

1. An image pickup apparatus having an image pickup device including a plurality of two-dimensionally arranged pixel sections, each of which has a photoelectric conversion part for generating electric charge by photoelectric conversion and has a floating diffusion part for storing the generated electric charge, comprising:
   a collective reset unit adapted to perform collective resetting of the photoelectric conversion parts and the floating diffusion parts of the plurality of two-dimensionally arranged pixel sections;
   a collective transfer unit adapted to collectively transfer electric charges stored in the photoelectric conversion parts to the floating diffusion parts after elapse of a predetermined time period from the collective resetting;
   a sequential reset unit adapted to perform, on a predetermined-number-of-pixel-sections basis, sequential resetting of the photoelectric conversion parts and the floating diffusion parts of the plurality of two-dimensionally arranged pixel sections;
   a sequential transfer unit adapted to perform, on the predetermined-number-of-pixel-sections basis, sequential transfer of the electric charges stored in the photoelectric conversion parts to the floating diffusion parts after elapse of a predetermined time period from the sequential resetting; and
   a detection unit adapted to calculate differential information based on pixel signals obtained by said collective transfer unit and said sequential transfer unit, and detect a flicker based on the calculated differential information.

2. The image pickup apparatus according to claim 1, wherein said collective reset unit performs the collective resetting of the photoelectric conversion parts and the floating diffusion parts of all of pixel sections in a photography screen, which are the plurality of pixel sections, and
   said sequence reset unit performs the sequential resetting of the photoelectric conversion parts and the floating diffusion parts of all the pixel sections in the photography screen.

3. The image pickup apparatus according to claim 2, wherein said detection unit calculates the differential information based on pixel signals obtained by said collective transfer unit and said sequential transfer unit with respect to pixel sections which are the same in position on the photography screen.

4. The image pickup apparatus according to claim 1, wherein said collective reset unit performs the collective resetting of the photoelectric conversion parts and the floating diffusion parts of pixel sections in a predetermined region that includes at least one row or at least one line of the plurality of two-dimensionally arranged pixel sections, and
   said sequence reset unit performs, on the predetermined-number-of-pixel-sections basis, the sequential resetting of the photoelectric conversion parts and the floating diffusion parts of pixel sections other than the pixel sections in the predetermined region among the plurality of two-dimensionally arranged pixel sections.

5. The image pickup apparatus according to claim 4, wherein the pixel sections in the predetermined region are located outside an effective pixel region of said image pickup device.

6. The image pickup apparatus according to claim 4, wherein in a case where an image is photographed by performing an operation of thinning at least one row or at least one line of the plurality of two-dimensionally arranged pixel sections, the pixel sections in the predetermined region are pixel sections in the at least one row or the at least one line thinned by the operation of thinning.

7. The image pickup apparatus according to claim 1, wherein said detection unit detects a flicker in a case where the differential information has a value equal to or larger than a predetermined threshold value and has a periodicity in a direction perpendicular to lines or rows of the plurality of two-dimensionally arranged pixel sections.

8. The image pickup apparatus according to claim 4, wherein said detection unit calculates the differential information based on a pixel signal obtained by said collective transfer unit with respect to a first pixel section and a pixel signal obtained by said sequential transfer unit with respect to a second pixel section located close to the first pixel section.

9. A flicker detection method for an image pickup apparatus having an image pickup device including a plurality of two-dimensionally arranged pixel sections, each of which has a photoelectric conversion part for generating electric charge by photoelectric conversion and has a floating diffusion part for storing the generated electric charge, comprising:
   a collective reset step of performing collective resetting of the photoelectric conversion parts and the floating diffusion parts of the plurality of two-dimensionally arranged pixel sections;
   a collective transfer step of collectively transferring electric charges stored in the photoelectric conversion parts to the floating diffusion parts after elapse of a predetermined time period from the collective resetting;
   a sequential reset step of performing, on a predetermined-number-of-pixel-sections basis, sequential resetting of the photoelectric conversion parts and the floating diffusion parts of the plurality of two-dimensionally arranged pixel sections;
   a sequential transfer step of performing, on the predetermined-number-of-pixel-sections basis, sequential transfer of the electric charges stored in the photoelectric conversion parts to the floating diffusion parts after elapse of a predetermined time period from the sequential resetting; and
   a detection step of calculating differential information based on pixel signals obtained in said collective transfer step and said sequential transfer step and detecting a flicker based on the calculated differential information.

10. The flicker detection method according to claim 9, wherein said collective reset step performs the collective resetting of the photoelectric conversion parts and the floating diffusion parts of pixel sections in a predetermined region that includes at least one row or at least one line of the plurality of two-dimensionally arranged pixel sections, and
   said sequence reset step performs, on the predetermined-number-of-pixel-sections basis, the sequential resetting of the photoelectric conversion parts and the floating diffusion parts of pixels section other than the pixel sections in the predetermined region among the plurality of two-dimensionally arranged pixel sections.

* * * * *